US007469825B2

(12) United States Patent
Clark et al.

(10) Patent No.: US 7,469,825 B2
(45) Date of Patent: Dec. 30, 2008

(54) SELF-SERVICE TERMINAL

(75) Inventors: Barrie Clark, Dundee (GB); Ross W Duncan, Blairgowrie (GB)

(73) Assignee: NCR Corporation, Dayton, OH (US)

( * ) Notice: Subject to any disclaimer, the term of this patent is extended or adjusted under 35 U.S.C. 154(b) by 430 days.

(21) Appl. No.: 11/148,631

(22) Filed: Jun. 9, 2005

(65) Prior Publication Data

US 2006/0000886 A1 Jan. 5, 2006

(30) Foreign Application Priority Data

Jun. 30, 2004 (GB) ................................ 0414578.5

(51) Int. Cl.
*G06K 15/00* (2006.01)

(52) U.S. Cl. ............ 235/383; 235/462.01; 235/462.11; 235/462.13

(58) Field of Classification Search ................. 235/383, 235/462.01, 462.11, 462.13, 379
See application file for complete search history.

(56) References Cited

U.S. PATENT DOCUMENTS

| | | | | |
|---|---|---|---|---|
| 5,677,700 | A | 10/1997 | Schwalba et al. | |
| 6,282,553 | B1 | 8/2001 | Flickner et al. | |
| 6,400,276 | B1 | 6/2002 | Clark | |
| 2003/0085281 | A1 * | 5/2003 | Knowles et al. | 235/454 |
| 2004/0099728 | A1 | 5/2004 | Magee et al. | |
| 2004/0129772 | A1 | 7/2004 | Ramachandran et al. | |

FOREIGN PATENT DOCUMENTS

| | | | |
|---|---|---|---|
| DE | 298 02 435 | U1 | 5/1998 |
| EP | 0 790 590 | A1 | 8/1997 |
| EP | 0 902 303 | A2 | 3/1999 |
| EP | 1 073 022 | A2 | 1/2001 |
| GB | 2 351 585 | A | 1/2001 |
| GB | 2 351 586 | A | 1/2001 |
| GB | 2 351 590 | A | 1/2001 |
| GB | 2 364 808 | A | 6/2002 |
| WO | WO 00/21024 | | 4/2000 |

* cited by examiner

*Primary Examiner*—Karl D. Frech
(74) *Attorney, Agent, or Firm*—Gregory A. Welte

(57) ABSTRACT

A self-service terminal (22) that includes an optical system (28) for detecting a terminal overlay or artifact.

18 Claims, 4 Drawing Sheets

SELF-SERVICE TERMINAL

BACKGROUND

The present invention relates to a self-service terminal, such as an automated teller machine (ATM).

FIGS. 1 and 2 show schematic views of a typical ATM 10. This includes a processor 12 for controlling interaction with the terminal 10 and communicating with a remote host (not shown). Connected to the processor 12 are the following: a screen 14 for presenting instructions to a user, a conventional keyboard 16 for receiving user inputs, a card slot 18 for allowing a user's bank card to be fed into a card reader and a dispensing slot 20 for allowing valuable media, such as cash to be dispensed. Data input by the user is received by the keyboard 16 and sent from there to the processor 12, which is programmed to react in accordance with any user requests.

In order to defraud ATM systems and/or customers, criminals are becoming increasingly sophisticated. For example, artefacts or overlays are sometimes added to the front of ATMs by fraudsters in order to collect data pertaining to customer transactions or intercept media entering or leaving the ATM (such as card trapping mechanisms). These add-ons are becoming so advanced they can blend in with the manufacturer's design of the ATM matching color, shape, etc. This can make it almost impossible for an untrained observer to establish that an additional device has compromised the ATM.

SUMMARY

According to one aspect of the invention there is provided a self-service terminal comprising means for sensing/detecting an unauthorized overlay or artifact on a portion of the terminal.

By providing a means for sensing/detecting the presence of a device overlaying a part of the terminal, for example the keyboard or card reader slot, potential fraud can be detected. In the event that such an overlay or device is detected, the terminal is operable to take remedial action such as shutting itself down.

The means for detecting/sensing may comprise an optical system having one or more optical sensors.

The optical system may be operable to detect long-term changes in the static topography of a front portion of the terminal, thereby to identify an unauthorized overlay. The optical system may be operable to determine a three-dimensional relief map of a portion of the terminal and use this to determine any changes in the static topography, thereby to detect an overlay or artifact.

Additionally or alternatively, the optical system may be operable to detect finger movement over the keyboard and use this to detect a terminal overlay. In particular, the optical system may include a camera that is operable to detect ambient light received from the vicinity of the keyboard to identify user selections and use the received light to detect a terminal overlay. In the event that the optical system detects that a user is interacting with the keyboard, but the received signal is interpreted as invalid, this is indicative of the presence of an overlay or some other potentially fraudulent activity.

The optical system may be operable to provide an optical keyboard using visible light, thereby to provide a visual guide for the user, as well to detect a terminal overlay. Alternatively, a mechanical/physical keyboard or pad arrangement may be provided as a visual guide. This could be visually identical to conventional terminal parts such keyboards or pad arrangements, so that users are comfortable with the look and feel of the terminal. However since the inputs are detected by the optical system, in this case the keyboard or pad arrangement would not be connected to any internal processors or other such devices.

The optical system may be provided internally of the terminal, ideally behind a window that is transparent at the operating wavelength of that system.

According to another aspect of the invention there is provided a method for detecting potential fraud in a self-service terminal, such as an automated teller machine, the method comprising sensing /detecting an unauthorized overlay or artifact that is carried or mounted on a portion of the terminal.

The method may involve detecting/sensing an overlay using an optical system having one or more optical sensors.

The method may involve detecting a change in height or width of a portion of the terminal.

The method may involve detecting changes in a static topography of a portion of the terminal, thereby to identify an unauthorized overlay. This may involve determining a three-dimensional relief map of all or designated portion of the terminal and using this to determine any changes.

Additionally or alternatively, the method may further involve using an optical system to detect finger movement over the keyboard and using this to detect a terminal overlay or artifact.

The method may further involve using visible light to provide a visual keyboard/user interface. Alternatively, the method may involve providing a mechanical/physical keyboard or pad arrangement for use as a visual guide.

According to another aspect of the invention there is provided a self-service terminal comprising an optical system for generating an optical user input interface. The optical system may be operable to detect an overlay or artifact on a front portion of the terminal.

BRIEF DESCRIPTION OF THE DRAWINGS

Various aspects of the invention will now be described by way of example only and with reference to the following drawings, of which.

DETAILED DESCRIPTION

Figure 1:
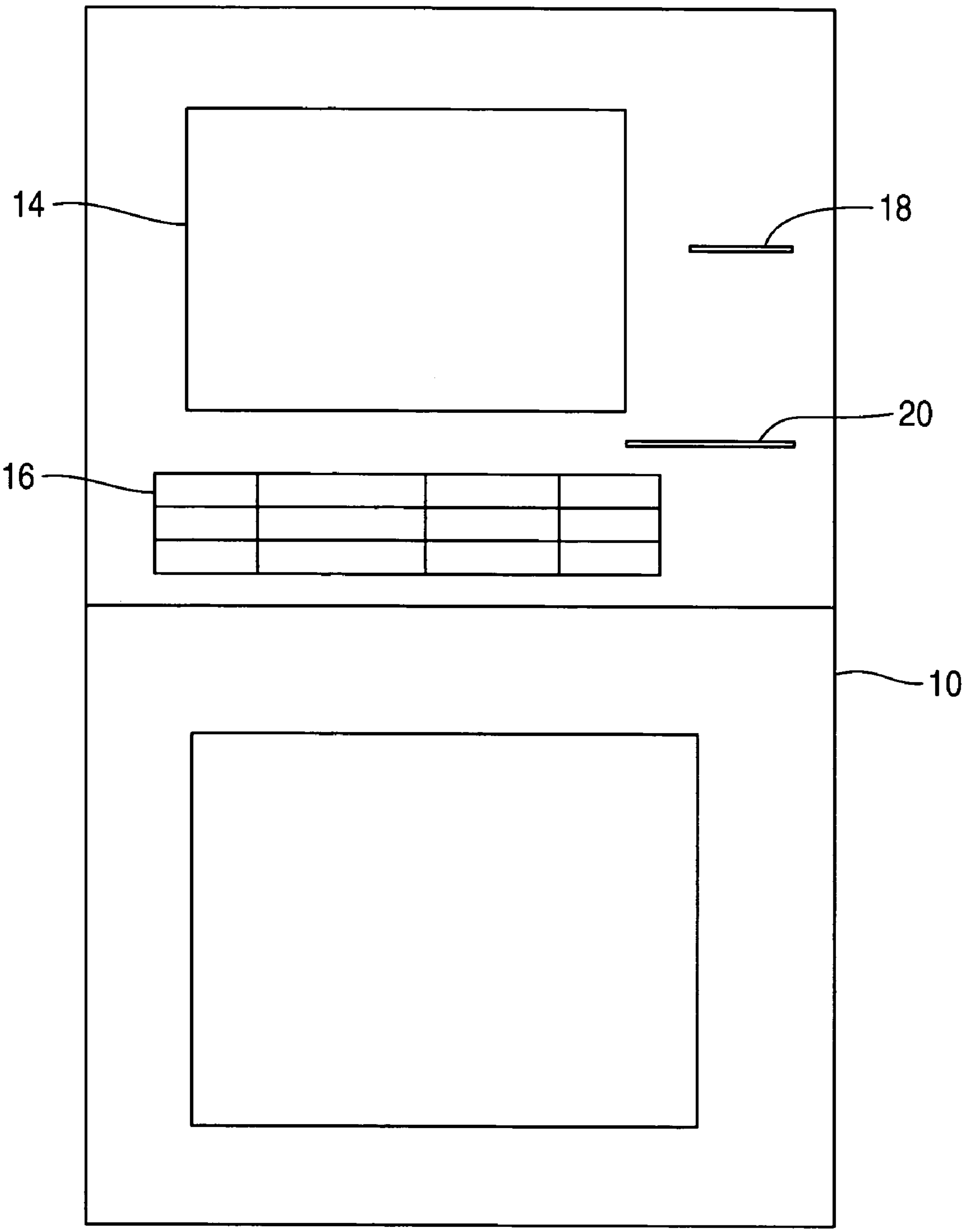
FIG. 1 PRIOR ART
FIGS. 1 and 2 show schematic views of a typical ATM 10.
Figure 2:
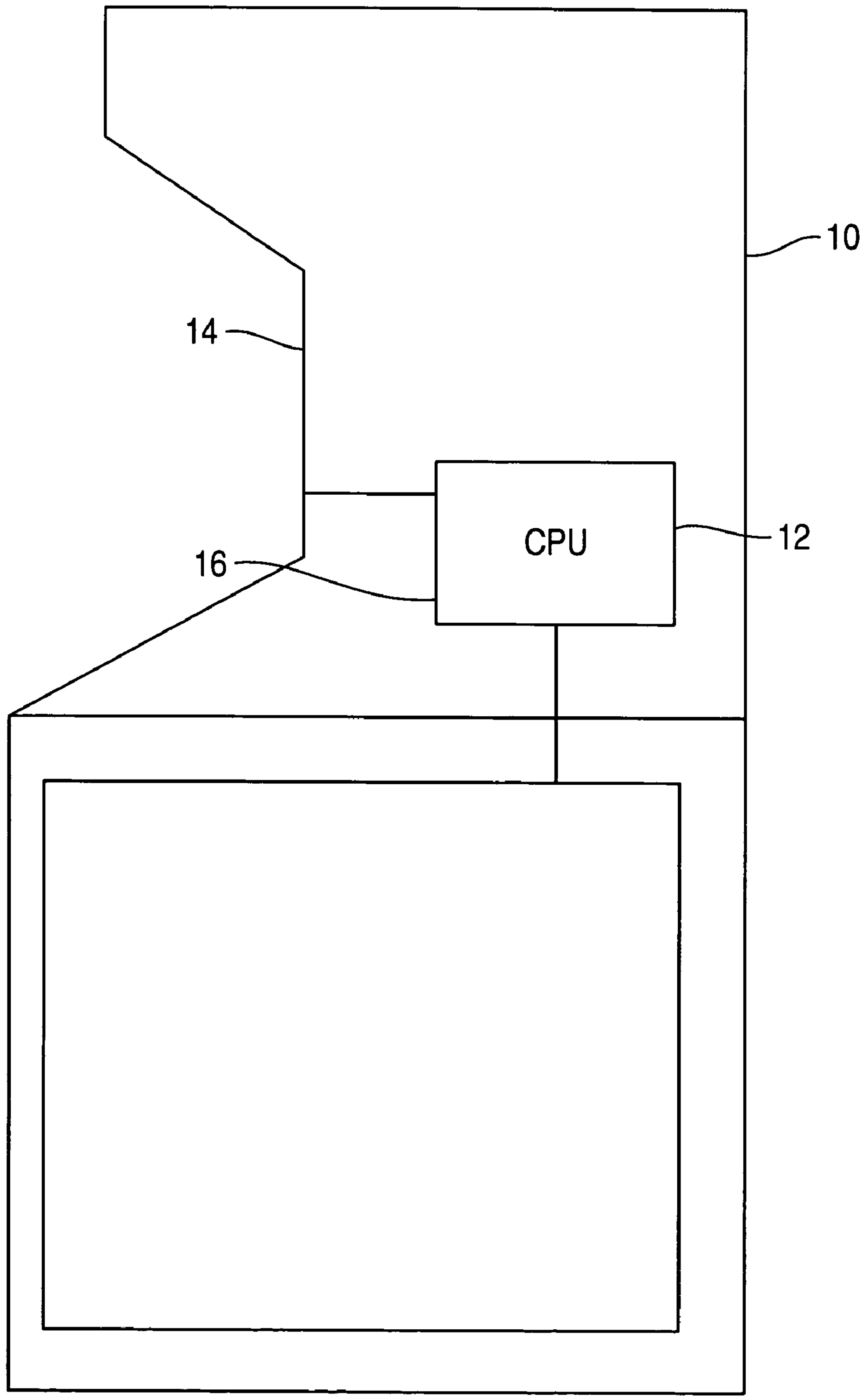
FIG. 2 PRIOR ART
Figure 3:
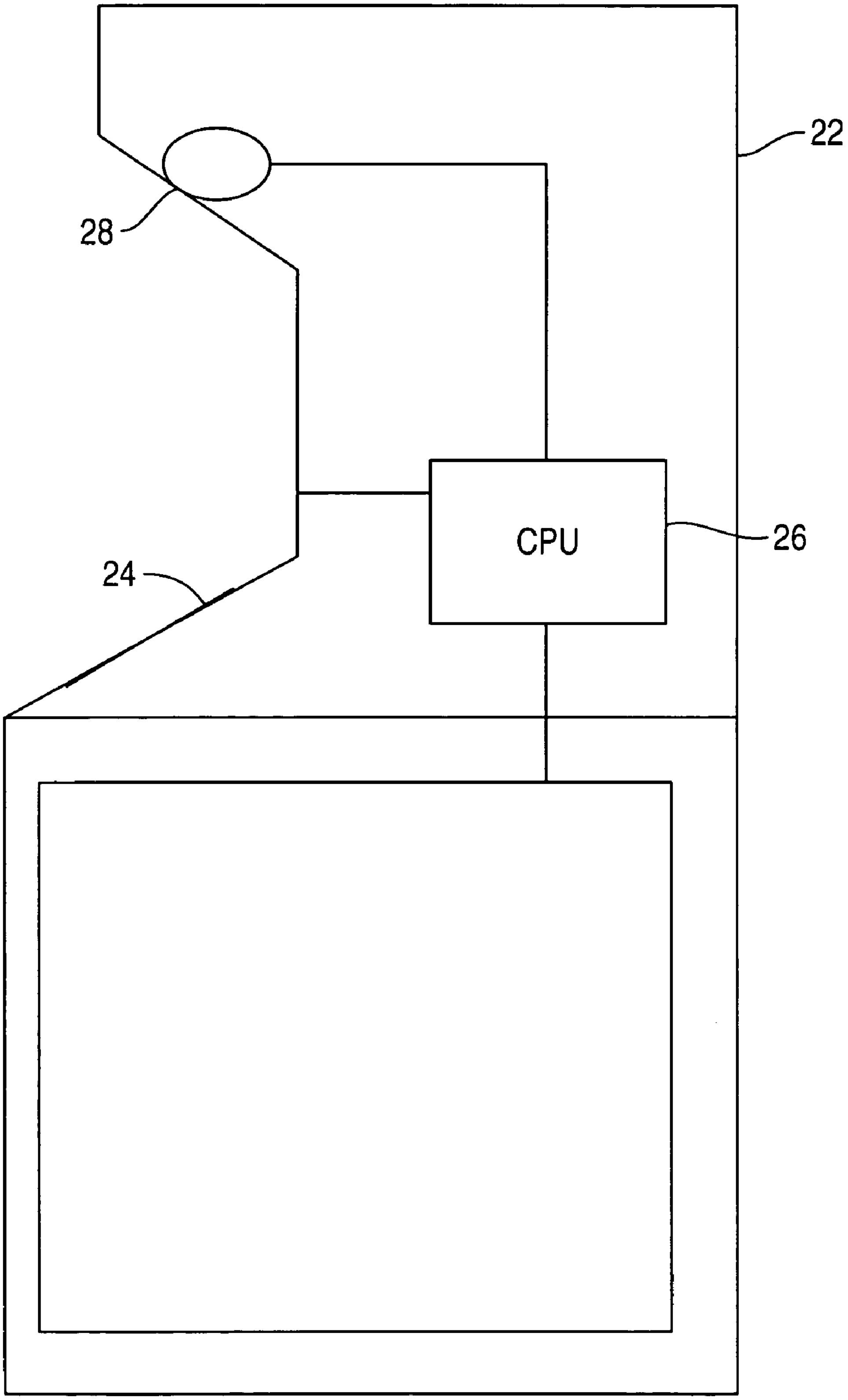
FIG. 3 is a cross section of an ATM that includes an optical activated keyboard.
Figure 4:
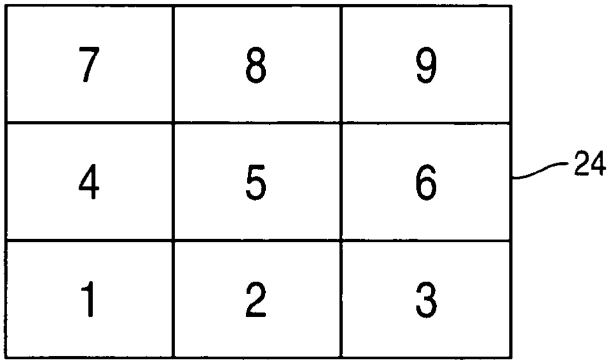
FIG. 4 is a front view of a dummy keyboard for use in the ATM of FIG. 3.

FIG. 3 shows an ATM 22 that has a virtual keyboard 24. By this it is meant that the keyboard 24 that is presented on the front of the terminal 24 is not connected to the processor 26 and instead is provided merely as a visual guide for a user. FIG. 4 shows an example of a suitable such keyboard 24. Typically this would be designed to have the look and feel of a conventional keyboard, so that customers would find it familiar. Associated with the keyboard 24 is an optical system 28. This includes a camera (not shown) having a plurality of optical detectors for detecting ambient light reflected from a front face of the terminal 22. Ideally, the optical system 28 is provided internally of the terminal, behind a window or portion of the housing that is optically transparent at the desired wavelength of operation.

The optical system 28 is provided for detecting possible device overlays and receiving and interpreting user inputs. The overlay detection process can be done either by using an optically derived static topography of a portion of the terminal, typically the keyboard or the card reader slot, or by identifying irregularities in received signals when a user is interacting with the keyboard. Any suitable optical arrangement could be used. A preferred example is described in U.S. Pat. No. 6,323,942, the contents of which are incorporated herein by reference. In this, "time of flight" calculations are used to determine the distance between the features under surveillance and an array of photo-detectors.

In a preferred embodiment, the optical system 28 is operable to detect ambient light reflected from the dummy keyboard 24 and use that to detect any long-term changes in the overall topography. This information can then be used to detect the presence of an overlay. This is done by monitoring the static topography as a function of time. In the event that a change is detected, for example a change in the level of the keyboard 24 above a pre-determined level, the optical system 28 is configured to send a signal indicative of this to the terminal processor. In response to receipt of this signal, the processor 26 is arranged to close down the terminal 22 and where appropriate notify the remote host (not shown). In this way, potential fraud can be detected and steps can be taken to limit any damage.

In addition to detecting changes in the static topography of the terminal, the optical system 28 of FIG. 3 is operable to function as part of an optically activated user input. In particular, the optical system 28 is able to monitor and detect when a user's hand is located over the dummy keyboard. In the event that a user's hand is detected, the optical system is operable to use light reflected therefrom to identify and monitor movement of the user's fingers, thereby to provide positional information. Using this positional information, the keys of the dummy keyboard 24 that are pressed by the user can be identified. Optionally, an IR sensor (not shown) may be provided for verifying user selections. Typically this would be positioned in the vicinity of the keyboard 24 so that it can detect when the user's fingers physically make contact with that keyboard 24. This information can be used to identify user selections, and in conjunction with the optical system 28 provide a means for verifying such selections. Once an input is identified using the optical system 28 and optionally verified using the IR sensor, a signal indicative of the user selection is sent from the optical system 28 to the processor 26, and the transaction can proceed in a conventional manner.

In practice, it is important for the relationship between the physical positions of the various parts of the dummy keyboard 24 and the optical system 28 of FIG. 3 to be well defined, in order to ensure correct interpretation of the detected light signals and thereby identify user selections. Even small variations in, for example, the height of the keyboard affect the integrity of the data received. Because of this, in the event that an overlay were to be fitted to the front of the ATM 22 in order to cover the keyboard 24 and thereby capture data entered by the user (such as their personal identification number), although finger movement would be detected, the reflected signals received by the optical system 28 would not be used to interpret user data input commands. Hence, a user would not be able to carry out a transaction. This inability to interpret the data would be identified by the system 28 as being indicative of the presence of an overlay.

As will be appreciated, detecting the presence of an overlay would not in itself prevent the capture by the overlay of the user's personal identification number. However, data received at the optical system 28 could be used to close down the ATM 22 and thereby limit the potential damage. To this end, the optical system 28 is configured to identify movement that would indicate user activity and in the event that this is interpreted as an invalid user keyboard input send a warning signal to the processor 26. The processor 26 is arranged so that on receipt of this signal, the ATM 22 can be closed down and an alarm signal sent to the remote host. By doing this subsequent frauds can be prevented and the host can be immediately alerted to the attack. In addition to this, where a user's private bank details have been entered, then the ATM 22 is operable to send a signal to the host to suspend the user's account. In this way, both the ATM 22 and the user can be protected.

Figure 5:
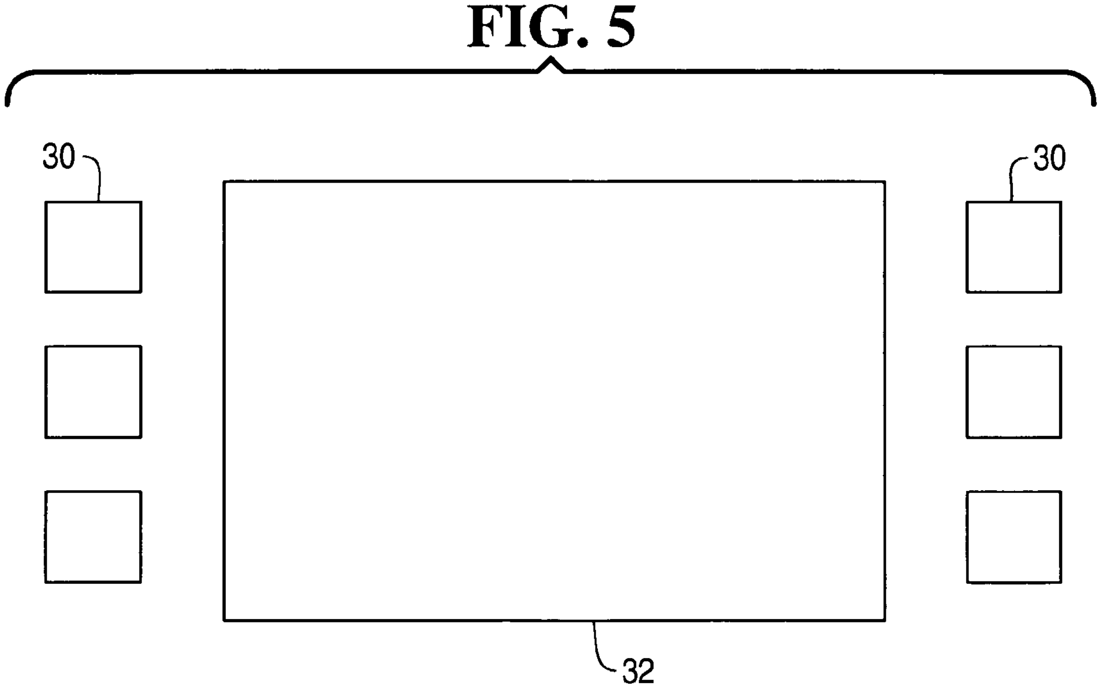
FIG. 5 is a front view of another dummy keyboard arrangement for use in the ATM of FIG. 3.

A skilled person will appreciate that variations of the disclosed arrangements are possible without departing from the invention. For example, whilst the optical system 28 is described as determining the user inputs, the positional data acquired by that system could instead be processed in the central ATM processor 26, thereby to provide details of the user inputs. Additionally or alternatively, whilst the dummy keyboard 24 described above is a physical board with keypads marked on it, the keyboard itself could be provided by projecting visible light onto a predetermined area of the front fascia of the ATM 22. Equally, although the keyboard of FIG. 4 is shown as having numbered keys, the arrangement of FIG. 5 could be used. In this, a plurality of keypads 30 is arranged around the terminal screen 32. These are functionally connected to information that is presented on the screen 32, so that user selections can be made. Furthermore, although the optical system described above is used for the dual purpose of identifying user inputs and detecting a terminal overlay, it will be appreciated that a simpler optical system could be used for detecting a change in height or width of any part of the terminal. Accordingly the above description of the specific embodiment is made by way of example only and not for the purposes of limitation. It will be clear to the skilled person that minor modifications may be made without significant changes to the operation described.

What is claimed is:

1. A self-service terminal which interacts with a customer, comprising:

a) a detector which is operable to detect an overlay or artifact on the terminal, which overlay or artifact
   i) mimics part of an actual terminal,
   ii) captures data entered by a customer, and
   iii) delivers the data to an unauthorized party.

2. A self-service terminal as claimed in claim 1, wherein the detector comprises an optical system which is operable to receive light reflected from the terminal and use the reflected light to detect the presence of an overlay.

3. A self-service terminal as claimed in claim 2, wherein the optical system is operable to provide an optically activatable user input.

4. A self-service terminal as claimed in claim 3, wherein a physical keyboard which acts as a visual guide for a user is associated with the optically activatable input.

5. A self-service terminal as claimed in claim 3, wherein the optical input is operable to generate an optical keyboard for use as a visual guide.

6. Apparatus according to claim 1, wherein the self-service terminal comprises an automated teller machine.

7. A method of detecting potential fraud in a self-service terminal which interacts with customers, the method comprising:

detecting an unauthorized overlay or artifact on a portion of the terminal which overlay or artifact mimics operation of a genuine component of the terminal.

8. A method as claimed in claim 7, wherein the detecting includes optically sensing the unauthorized overlay or artifact.

9. A method as claimed in claim 8, wherein the detecting includes detecting changes in a static topography of at least a portion of the terminal to identify the unauthorized overlay or artifact.

10. A method as claimed in claim 9, wherein the detecting changes in the static topography includes determining a three-dimensional relief map of the portion of the terminal and using the map to detect any changes.

11. A method as claimed in claim 8, wherein the optically sensing includes detecting finger movement over a keyboard and using this to indicate presence of the unauthorized overlay or artifact.

12. A method as claimed in claim 11, further comprising projecting light onto a target area and detecting light reflected from the target area to verify user selections.

13. A method as claimed in claim 7, further comprising shutting down at least one part of the terminal so that the terminal appears to be or is inactive in the event that an overlay or artifact is detected.

14. A method as claimed in claim 7, further comprising using visible light to provide a visual keyboard/user interface.

15. A method as claimed in claim 7, further comprising providing a mechanical/physical keyboard or pad arrangement for use as a visual guide.

16. A method as claimed in claim 7, wherein the self-service terminal comprises an automated teller machine.

17. A self-service terminal, comprising:

a) an automated teller machine, ATM;

b) an optical system which i) detects changes in topography on a user interface of the ATM, thereby detecting a device attached to the ATM which changes said topography, and ii) issues an alarm when a predetermined change is detected.

18. Terminal according to claim 17, in which the ATM shuts down, after the alarm is issued.

* * * * *